US012698392B2

(12) United States Patent
Sangregorio et al.

(10) Patent No.: US 12,698,392 B2
(45) Date of Patent: Aug. 4, 2026

(54) POLYCARBONATE COMPOSITION, METHOD FOR THE MANUFACTURE THEREOF, AND ARTICLES FORMED THEREFROM

(71) Applicant: SHPP GLOBAL TECHNOLOGIES B.V., Bergen op Zoom (NL)

(72) Inventors: Anna Sangregorio, Breda (NL); Mark Adrianus Johannes Van Der Mee, Etten Leur (NL); Tony Farrell, Bergen op Zoom (NL); Peter Vollenberg, Evansville, IN (US); Rahul Patil, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 582 days.

(21) Appl. No.: 18/037,399

(22) PCT Filed: Nov. 18, 2021

(86) PCT No.: PCT/IB2021/060681

§ 371 (c)(1),
(2) Date: May 17, 2023

(87) PCT Pub. No.: WO2022/107029

PCT Pub. Date: May 27, 2022

(65) Prior Publication Data

US 2024/0002657 A1 Jan. 4, 2024

(30) Foreign Application Priority Data

Nov. 18, 2020 (EP) .................................... 20208440

(51) Int. Cl.
*C08L 69/00* (2006.01)
*C08K 5/5399* (2006.01)
*C08L 83/10* (2006.01)
*C08G 77/448* (2006.01)
*C08K 5/00* (2006.01)

(52) U.S. Cl.
CPC ............ *C08L 69/00* (2013.01); *C08K 5/5399* (2013.01); *C08L 83/10* (2013.01); *C08G 77/448* (2013.01); *C08K 5/0066* (2013.01)

(58) Field of Classification Search
CPC combination set(s) only.
See application file for complete search history.

(56) References Cited

U.S. PATENT DOCUMENTS 5,380,795 A 1/1995 Gosens et al.
7,232,865 B2 6/2007 DeRudder et al.
7,615,594 B2 11/2009 Hashimoto et al.
8,466,249 B2 6/2013 Gallucci et al.
8,779,040 B2 7/2014 Van Der Weele et al.
8,841,367 B2 9/2014 Zheng et al.
9,018,286 B2 4/2015 Daga et al.
9,023,923 B2 5/2015 An et al.
9,096,785 B2 8/2015 Guo et al.
9,266,541 B2 2/2016 Van Der Mee et al.
9,499,695 B2 11/2016 Tomita et al.
9,598,577 B1 3/2017 Groote et al.
9,598,578 B1 3/2017 Groote et al.
9,725,594 B2 8/2017 Atkinson et al.
9,790,363 B2 10/2017 Chen et al.
10,501,624 B2 12/2019 Jung et al.
10,655,001 B2 5/2020 Hein et al.
11,104,796 B2 8/2021 Chen et al.
11,873,375 B2 1/2024 Schwartz et al.
2002/0026008 A1 2/2002 Okamoto et al.
2005/0187372 A1 8/2005 Venderbosch et al.
2006/0074156 A1 4/2006 Ebeling et al.
2006/0142438 A1 6/2006 Ishii et al.
2007/0129492 A1 6/2007 Colborn et al.
2007/0148257 A1 6/2007 Gerace et al.
2008/0015289 A1 1/2008 Siripurapu
2012/0288654 A1 11/2012 Gallucci et al.
2012/0302663 A1 11/2012 Park et al.
2013/0190425 A1* 7/2013 Zhu ........................ C08L 69/00
523/451
2013/0313493 A1 11/2013 Wen et al.
2013/0317142 A1 11/2013 Chen et al.
2013/0317150 A1 11/2013 Wan et al.
2014/0058023 A1 2/2014 Wan et al.
2014/0107264 A1 4/2014 Van Der Weele et al.

(Continued)

FOREIGN PATENT DOCUMENTS

CN 105315644 A 2/2016
EP 2890743 B1 7/2017

(Continued)

OTHER PUBLICATIONS

First Office Action for the corresponding Chinese Application No. 202180073883.7, Date of Issue: May 23, 2025; 10 pages, English translation.

(Continued)

*Primary Examiner* — Marc S Zimmer

(74) *Attorney, Agent, or Firm* — CANTOR COLBURN LLP

(57) ABSTRACT

A polycarbonate composition includes particular amounts of a bisphenol A polycarbonate homopolymer, a particular polycarbonate-siloxane copolymer a poly(ester-carbonate), and, optionally, an organophosphorus flame retardant. Methods of making the composition and articles including the composition are also described.

16 Claims, No Drawings

(56) References Cited

U.S. PATENT DOCUMENTS

| | | | | |
|---|---|---|---|---|
| 2014/0179821 | A1 | 6/2014 | Morizur et al. | |
| 2014/0179843 | A1 | 6/2014 | Van Der Mee et al. | |
| 2014/0326162 | A1 | 11/2014 | Van Der Mee et al. | |
| 2014/0357769 | A1 | 12/2014 | Zheng et al. | |
| 2015/0237866 | A1 | 8/2015 | Goudswaard et al. | |
| 2015/0240074 | A1* | 8/2015 | Chen | C08K 5/523 524/91 |
| 2016/0326366 | A1* | 11/2016 | Sybert | C08L 79/08 |
| 2017/0044363 | A1 | 2/2017 | Okamoto et al. | |
| 2017/0129997 | A1 | 5/2017 | Lyakhovych et al. | |
| 2017/0137621 | A1 | 5/2017 | Groote et al. | |
| 2017/0247539 | A1 | 8/2017 | Chen et al. | |
| 2017/0369702 | A1 | 12/2017 | Li et al. | |
| 2018/0066134 | A1 | 3/2018 | Aoki et al. | |
| 2018/0237609 | A1 | 8/2018 | Ishikawa et al. | |
| 2018/0251636 | A1 | 9/2018 | Abe et al. | |
| 2020/0010683 | A1 | 1/2020 | Ishikawa et al. | |
| 2020/0369875 | A1 | 11/2020 | Shan et al. | |
| 2021/0198481 | A1 | 7/2021 | Huang et al. | |
| 2021/0284837 | A1 | 9/2021 | Ishikawa et al. | |

FOREIGN PATENT DOCUMENTS

| | | | | |
|---|---|---|---|---|
| EP | 3572453 | A1 | 11/2019 | |
| EP | 3712209 | A1 | 9/2020 | |
| JP | 07216080 | A | 8/1995 | |
| JP | 2015137308 | A | 7/2015 | |
| JP | 2017038842 | A | 2/2017 | |
| KR | 20070018801 | A | 2/2007 | |
| KR | 101741174 | | 5/2017 | |
| KR | 20190019634 | A | 2/2019 | |
| WO | 2013066000 | A1 | 5/2013 | |
| WO | 2013175448 | A1 | 11/2013 | |
| WO | 2014032616 | A1 | 3/2014 | |
| WO | 2016063154 | A1 | 4/2016 | |
| WO | 2016174592 | A1 | 11/2016 | |
| WO | 2019062472 | A1 | 4/2019 | |
| WO | WO-2019123029 | A1 * | 6/2019 | C08L 69/00 |
| WO | 2020079565 | A1 | 4/2020 | |
| WO | 2020178709 | A1 | 9/2020 | |
| WO | WO-2020261080 | A1 * | 12/2020 | C08L 69/005 |
| WO | 2022106912 | A1 | 5/2022 | |
| WO | 2022107028 | A1 | 5/2022 | |
| WO | 2022107030 | A1 | 5/2022 | |

OTHER PUBLICATIONS

Second Office Action for the European Application No. 21814910.2, Date of Mailing: May 28, 2025; 4 pages.

International Search Report and Written Opinion for the corresponding International Application No. PCT/IB2021/060681; International Filing Date: Nov. 18, 2021; Date of Mailing: Jan. 26, 2022; 11 pages.

Van de Grampel et al., "New Polycarbonate-Polysiloxane Copolymer Blend Resins for Consumer Electronic Applications", ANTEC, 2014, pp. 2375-2378.

Pearson et al., "Epoxy Polymers Toughened by Triblock Copolymers", ANTEC, 2009, pp. 1351-1354.

Chinese Office Action for the corresponding Chinese Application No. 202180073883.7, Date of Issue: Dec. 11, 2025; 13 pages, English translation.

US Non-Final Office Action dated Jan. 28, 2026 for U.S. Appl. No. 18/037,404.

US Non-Final Office Action dated Nov. 14, 2025 for U.S. Appl. No. 18/037,170.

US Non-Final Office Action dated Nov. 28, 2025 for U.S. Appl. No. 18/037,152.

* cited by examiner

POLYCARBONATE COMPOSITION, METHOD FOR THE MANUFACTURE THEREOF, AND ARTICLES FORMED THEREFROM

CROSS-REFERENCE TO RELATED APPLICATIONS

This application is a National Stage application of PCT/IB2021/060681, filed Nov. 18, 2021, which claims priority to and the benefit of European Patent Application No. 20208440.6, filed on Nov. 18, 2020, the contents of both of which are incorporated by reference herein in their entirety.

BACKGROUND

Polycarbonate homopolymers and polycarbonate copolymers are useful in a wide variety of applications at least in part because of their good balance of properties, such as moldability, heat resistance and impact properties, among others. Despite extensive research on these materials over the years, there still remains a need in the art for improved polycarbonate compositions that meet increasingly stringent industry standards.

For example, polycarbonate-polysiloxane copolymers can have good mechanical properties and low temperature impact resistance. However, chemical resistance can be difficult to achieve. There is also a need for compositions that can further exhibit good flame retardance without sacrificing chemical resistance and impact properties. Achieving this balance of properties, especially in the absence of halogenated flame retardants, is challenging.

There accordingly remains a need in the art for polycarbonate compositions that can have balanced mechanical properties including low temperature impact, chemical resistance, and flame retardance.

SUMMARY

A polycarbonate composition comprises 10 to 99 weight percent, based on the total weight of the polycarbonate composition, of a bisphenol A polycarbonate homopolymer; a polycarbonate-siloxane copolymer having a siloxane content of greater than 30 to 70 weight percent, preferably 35 to 65 weight percent, based on the total weight of the polycarbonate-siloxane copolymer; wherein the polycarbonate-siloxane copolymer is present in an amount to provide a total siloxane content of 0.5 to 20 weight percent, based on the total weight of the polycarbonate composition; 15 to 45 weight percent of a poly(ester-carbonate); and optionally, 0.5 to 6 weight percent, based on the total weight of the polycarbonate composition, of an organophosphorus flame retardant.

A method of making the polycarbonate composition comprises melt-mixing the components of the composition, and, optionally, extruding the composition.

An article comprises the polycarbonate composition.

The above described and other features are exemplified by the following detailed description.

DETAILED DESCRIPTION

Provided herein are polycarbonate compositions having a desirable combination of properties, including impact strength, chemical resistance, and, when a particular flame retardant is included in the composition, flame retardance. The present inventors have determined that such properties can be obtained with a polycarbonate composition including particular amounts of a bisphenol A polycarbonate homopolymer, a polycarbonate-siloxane copolymer having a siloxane content of greater than 30 to 70 weight percent, a poly(ester-carbonate), and optionally, an organophosphorus flame retardant.

Accordingly, an aspect is a polycarbonate composition. The polycarbonate composition comprises a bisphenol A polycarbonate homopolymer, also referred to as a bisphenol A homopolycarbonate. The bisphenol A polycarbonate homopolymer has repeating structural carbonate units of the formula (1).

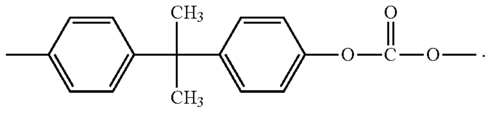
(1)

Bisphenol A polycarbonate homopolymers can be manufactured by processes such as interfacial polymerization and melt polymerization, which are known, and are described, for example, in WO 2013/175448 A1 and WO 2014/072923 A1, from bisphenol A ((2,2-bis(4-hydroxyphenyl)propane, or BPA). An endcapping agent can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p-tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Phenol and para-cumylphenol are specifically mentioned. Combinations of different endcapping agents can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 4 weight percent (wt %). Combinations comprising linear polycarbonates and branched polycarbonates can be used.

The bisphenol A polycarbonate homopolymer is a linear bisphenol A polycarbonate homopolymer, optionally endcapped with phenol or para-cumylphenol, and having a weight average molecular weight of 10,000 to 100,000 grams per mole (g/mol), preferably 15,000 to 40,000 g/mol, as measured by gel permeation chromatography (GPC), using a crosslinked styrene-divinylbenzene column and calibrated to bisphenol A polycarbonate references. GPC samples are prepared at a concentration of 1 mg per ml and are eluted at a flow rate of 1.5 ml per minute. In an aspect, the bisphenol A polycarbonate homopolymer can comprise a linear bisphenol A polycarbonate homopolymer having a weight average molecular weight of 15,000 to 25,000 grams per mole, preferably 17,000 to 25,000 grams per mole, as determined by GPC. In an aspect, the bisphenol A polycarbonate homopolymer can comprise a linear bisphenol A polycarbonate homopolymer having a weight average molecular weight of 26,000 to 40,000 grams per mole, preferably 27,000 to 35,000 grams per mole, as determined by GPC.

In an aspect, more than one bisphenol A polycarbonate homopolymer can be present. For example, the bisphenol A polycarbonate homopolymer can comprise a first bisphenol A polycarbonate homopolymer having a weight average molecular weight of 15,000 to 25,000 g/mol or 17,000 to 23,000 g/mol or 18,000 to 22,000 g/mol, and a second bisphenol A polycarbonate homopolymer having a weight average molecular weight of 26,000 to 40,000 g/mol or 26,000 to 35,000 g/mol, each measured by GPC using BPA homopolycarbonate standards. The weight ratio of the first bisphenol A polycarbonate homopolymer relative to the second bisphenol A polycarbonate homopolymer is 10:1 to 1:10, preferably 5:1 to 1:5, more preferably 3:1 to 1:3 or 2:1 to 1:2.

The bisphenol A polycarbonate homopolymer can be present in an amount of 10 to 99 weight percent, based on the total weight of the polycarbonate composition. Within this range, the bisphenol A polycarbonate homopolymer can be present in an amount of 25 to 90 weight percent, or 25 to 75 weight percent, or 40 to 90 weight percent, or 50 to less than 86 weight percent, or 50 to 85 weight percent, or 50 to 80 weight percent, or 50 to 75 weight percent.

In addition to the bisphenol A polycarbonate homopolymer, the polycarbonate composition comprises a polycarbonate-siloxane copolymer. Polycarbonate-siloxane copolymers are also known as polycarbonate-siloxanes. The polycarbonate-siloxane copolymer comprises carbonate repeat units and siloxane units. The carbonate units can be derived from a dihydroxy aromatic compound such as a bisphenol of formula (2) or a diphenol of formula (3)

(2)

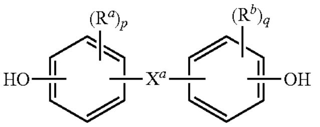

(3)

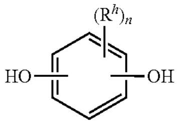

wherein in formula (2) $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, or a group of the formula —$C(=R^e)$— wherein $R^e$ is a divalent $C_{1-10}$ hydrocarbon group; and in formula (3), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In an aspect in formulas (2) and (3), $R^a$ and $R^h$ are each independently $C_{1-3}$ alkyl or $C_{1-3}$ alkoxy, p and q are each independently 0 to 1, and $X^a$ is a single bond, —O—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In an aspect in formulas (2) and (3), $R^a$ and $R^h$ are each independently $C_{1-3}$ alkyl, p and q are each independently 0 or 1, and $X^a$ is a single bond, —O—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In an aspect in formula (2), p and q are each independently 0, and $X^a$ is a single bond, —O—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl.

In an aspect in formula (2), p and q are each independently 0, and $X^a$ is a $C_{1-11}$ alkylidene of formula —$C(R^c)(R^d)$— wherein $R^c$ and $R^d$ are each independently hydrogen or $C_{1-10}$ alkyl.

In an aspect in formula (2), p and q are each independently 0, and $X^a$ is a $C_{1-11}$ alkylidene of formula —$C(R^c)(R^d)$— wherein $R^c$ and $R^d$ are each independently $C_{1-10}$ alkyl, preferably methyl.

Examples of bisphenol compounds (2) include BPA, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane (spirobiindane bisphenol), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole. A combination comprising different bisphenol compounds can be used.

Examples of diphenol compounds (3) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination comprising different diphenol compounds can be used.

In an aspect the carbonate units can be bisphenol carbonate units derived from bisphenols of formula (2). A preferred bisphenol is BPA.

The siloxane units (also referred to as polysiloxane blocks) are optionally of formula (4)

(4)

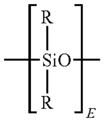

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with fluorine, chlorine, bromine, or iodine, or a combination thereof. In an aspect, where a transparent poly(carbonate-siloxane) is desired, R is unsubstituted by halogen. Combinations of the foregoing R groups can be used in the same copolymer.

In an aspect, R is a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In an aspect, R is methyl, trifluoromethyl, or phenyl.

The value of E in formula (4) can vary widely depending on the type and relative amount of each component in the polycarbonate composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, in still another aspect, E has an average value of 40 to 80 or 40 to 70, and in yet another aspect, E has an average value of 10 to 100, or 20 to 60, or 30 to 50.

In an aspect, the siloxane units are of formula (5)

(5)

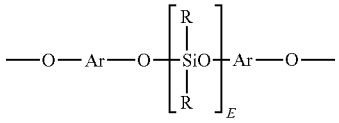

wherein E is as defined above in the context of formula (4); each R can be the same or different, and is as defined above in the context of formula (4); and Ar can be the same or different, and is a substituted or unsubstituted $C_{6-30}$ arylene, wherein the bonds are directly connected to an aromatic moiety. Ar groups in formula (5) can be derived from a $C_{6-30}$ dihydroxyarylene compound, for example a dihydroxy compound of formula (3). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (5a) and (5b).

(5a)

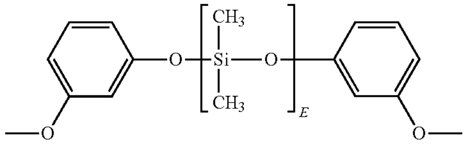

(5b)

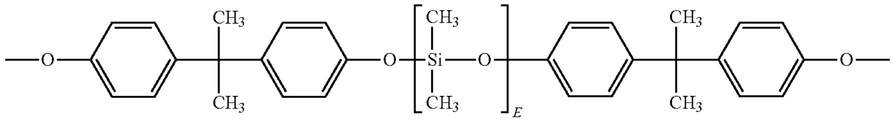

In an aspect, the siloxane units are of formula (6)

(6)

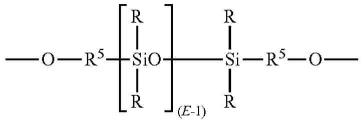

wherein R and E are as described above in the context of formula (4), and each $R^5$ is independently a divalent $C_{1-30}$ organic group, and wherein the polymerized polysiloxane unit is the reaction residue of its corresponding dihydroxy compound. In an aspect, the polydiorganosiloxane blocks are of formula (7):

(7)

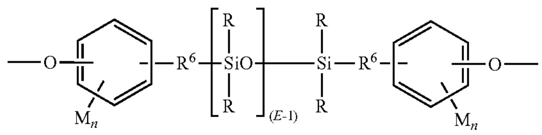

wherein R and E are as defined above in the context of formula (4). $R^6$ in formula (7) is a divalent $C_{2-8}$ aliphatic. Each M in formula (7) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkylenoxy, $C_{7-12}$ alkylarylene, or $C_{7-12}$ alkylarylenoxy, wherein each n is independently 0, 1, 2, 3, or 4.

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In an aspect, R is methyl, or a combination of methyl and trifluoropropyl, or a combination of methyl and phenyl. In an aspect, R is methyl, M is methoxy, n is one, and $R^6$ is a divalent $C_{1-3}$ aliphatic group. Specific polydiorganosiloxane blocks are of the formula (7a)

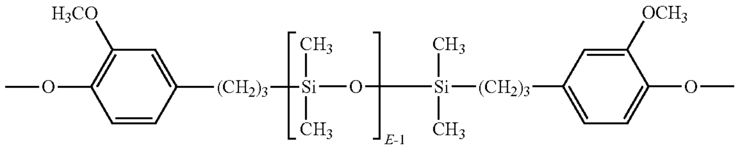

, (7b)

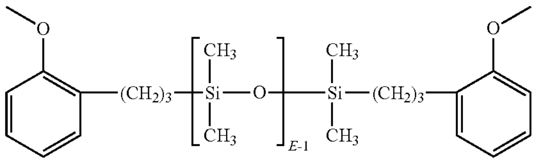

, (7c)

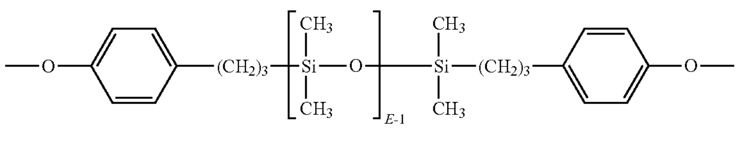

, or a combination thereof, wherein E has an average value of 10 to 100, preferably 20 to 60, more preferably 30 to 50, or 40 to 50.

Blocks of formula (7) can be derived from the corresponding dihydroxy polydiorganosiloxanes by known methods. The polycarbonate-siloxane can be manufactured by introducing phosgene under interfacial reaction conditions into a mixture of bisphenol and an end capped polydimethylsiloxane (PDMS). Other known methods can also be used.

In an aspect, the polycarbonate-siloxane comprises carbonate units derived from bisphenol A, and repeating siloxane units (5a), (5b), (7a), (7b), (7c), or a combination thereof (preferably of formula 7a), wherein E has an average value of 10 to 100, preferably 20 to 80, or 30 to 70, more preferably 30 to 50 or 40 to 50.

The polycarbonate-siloxane copolymer can have a siloxane content of 30 to 70 weight percent, based on the total weight of the polycarbonate-siloxane copolymer. Within this range, the polycarbonate-siloxane copolymer can have a siloxane content of greater than 30 to 70 weight percent, or 35 to 70 weight percent, or 35 to 65 weight percent. As used herein, "siloxane content" of a polycarbonate-siloxane refers to the content of siloxane units based on the total weight of the polysiloxane-polycarbonate copolymer.

The polycarbonate-siloxane copolymer can have a weight average molecular weight of 17,000 to 50,000 g/mol. Within this range, the weight average molecular weight can be 17,000 to 45,000 g/mol, or 20,000 to 45,000 g/mol, or 30,000 to 45,000 g/mol, or 32,000 to 36,000 g/mol, or 30,000 to 45,000 g/mol, or 32,000 to 45,000 g/mol, or 35,000 to 45,000 g/mol, or 35,000 to 40,000 g/mol, or 32,000 to 40,000 g/mol. In an aspect, the polycarbonate-siloxane copolymer can have a weight average molecular weight of 26,000 to 45,000 g/mol, or 30,000 to 45,000 g/mol, or 35,000 to 40,000 g/mol. The weight average molecular weight can be measured by gel permeation chromatography using a crosslinked styrene-divinyl benzene column, at a sample concentration of 1 milligram per milliliter, and as calibrated with bisphenol A polycarbonate standards.

In an aspect, the composition comprises less than or equal to 5 weight percent or less than or equal to 1 weight percent, or less than or equal to 0.1 weight percent of a polycarbonate-siloxane having a siloxane content of less than 30 weight percent, or a siloxane content of less than or equal to 10 weight percent. Preferably a polycarbonate-siloxane having a siloxane content of less than or equal to 30 weight percent or a siloxane content of 10 weight percent is excluded from the composition.

The polycarbonate-siloxane copolymer can be present in the composition in an amount to provide a total siloxane content of 0.5 to 20 weight percent, or 0.5 to 10 weight percent, or 1 to 8 weight percent, or 1 to 6 weight percent or 1.5 to 4 weight percent, each based on the total weight of the polycarbonate composition.

In an aspect, the composition can have a total siloxane content of greater than 6 to 10 weight percent, and the weight average molecular weight of the polycarbonate-siloxane copolymer can be greater than 21,000 g/mol. In an aspect, the composition can have a total siloxane content that is greater than 4 to 6 weight percent, and the weight average molecular weight of the polycarbonate-siloxane copolymer can be greater than 25,000 to less than 45,000 g/mol. In an aspect, the composition can have a total siloxane content that is up to 4 weight percent, and the weight average molecular weight of the polycarbonate-siloxane copolymer can be greater than 30,000 to less than 40,000 g/mol.

In an aspect, the polycarbonate-siloxane copolymer can be present in an amount of 3 to 25 weight percent, or 5 to 25 weight percent, or 5 to 20 percent, or 3 to 15 weight percent, or 5 to 15 weight percent or 3 to 12 weight percent, each based on the total weight of the polycarbonate composition.

In addition to the bisphenol A polycarbonate copolymer and the polycarbonate-siloxane copolymer, the polycarbonate composition further comprises a poly(ester-carbonate). Poly(ester-carbonate)s contain carbonate chain units of formula (8) and repeating ester units of formula (9)

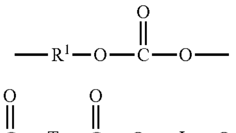
(8)

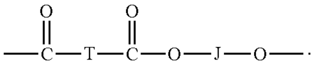
(9)

In formula (8), at least 60 percent of the total number of $R^1$ groups are aromatic, or each $R^1$ contains at least one $C_{6-30}$ aromatic group. Preferably, each $R^1$ can be derived from a dihydroxy compound such as an aromatic dihydroxy compound of formula (2) or a bisphenol of formula (3), discussed above.

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

In formula (9), J is a divalent group derived from a dihydroxy compound (which includes a reactive derivative thereof), and can be, for example, a $C_{1-10}$ alkylene, a $C_{6-20}$ cycloalkylene, a $C_{5-20}$ arylene, or a polyoxyalkylene group in which the alkylene groups contain 2 to 6 carbon atoms, preferably, 2, 3, or 4 carbon atoms; and T is a divalent group derived from a dicarboxylic acid (which includes a reactive derivative thereof), and can be, for example, a $C_{1-20}$ alkylene, a $C_{5-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), or a combination thereof. Aromatic dicarboxylic acids that can be used include terephthalic acid, isophthalic acid, naphthalene dicarboxylic acid, 1,4-cyclohexane dicarboxylic acid, or a combination thereof acids. A combination of isophthalic acid and terephthalic acid wherein the weight ratio of isophthalic acid to terephthalic acid is 91:9 to 2:98 can be used.

Specific ester units include ethylene terephthalate units, n-proplyene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example fro 1:99 to 99:1, or from 10:90 to 90:10, or from 20:80 to 80:20, or from 1:99 to 50:50, or from 50:50 to 99:1.

In an aspect, the poly(carbonate-ester) comprises a poly (aromatic ester-carbonate) comprising bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units. Another specific poly(ester-carbonate) comprises resorcinol isophthalate and terephthalate units and bisphenol A carbonate units.

In a specific aspect, the poly(carbonate-ester) is a poly (bisphenol A carbonate)-co-(bisphenol A-phthalate-ester) of formula (10)

(10)

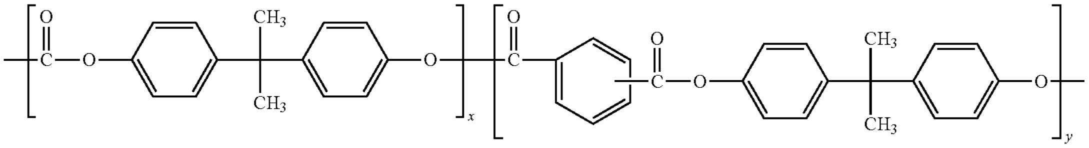

wherein y and x represent the weight percent of arylate-bisphenol A ester units and bisphenol A carbonate units, respectively. Generally, the units are present as blocks. In an aspect, the weight percent of ester units y to carbonate units x in the copolymers is 50:50 to 99:1, or 55:45 to 90:10, or 75:25 to 95:5. Copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE). Copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

The poly(carbonate-ester) can be present in an amount of 15 to 60 weight percent, based on the total weight of the polycarbonate composition. Within this range, the poly (carbonate-ester) can be present in an amount of 15 to 55 weight percent, or 15 to 50 weight percent, or 20 to 60 weight percent, or 20 to 55 weight percent, or 20 to 40 weight percent.

In an aspect, one or more of the bisphenol A homopolymer carbonate, the polycarbonate-siloxane copolymer, and the poly(carbonate-ester) are derived from post-consumer recycled or post-industrial recycled materials. In an aspect, one or more of the bisphenol A homopolymer carbonate, the polycarbonate-siloxane copolymer, and the poly(carbonate-ester) can be produced from at least one monomer derived from bio-based or plastic waste feedstock.

In an aspect, in addition to the bisphenol A polycarbonate copolymer, the polycarbonate-siloxane copolymer, and the poly(carbonate-ester), the polycarbonate composition can optionally further comprise an organophosphorus flame retardant. When present, the organophosphorus flame retardant can include, but is not limited to, organic phosphates and organic compounds containing phosphorus-nitrogen bonds.

In an aspect, the organophosphorus flame retardant can comprise a phosphate ester, for example an aromatic phosphate ester. Exemplary aromatic phosphates can include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), resorcinol bis(di-2,6-xylylphosphate) (RDX), the bis(diphenyl) phosphate of hydroquinone and the bis(diphenyl) phosphate of bisphenol A, respectively, and their oligomeric and polymeric counterparts. In an aspect, the phosphate ester flame retardant can be resorcinol bis(di-2,6-xylylphosphate).

In an aspect, the organophosphorus flame retardant can comprise an oligomeric phosphate ester flame retardant. The oligomeric phosphate ester flame retardant can comprise 5 to 15 weight percent phosphorus, based on the total weight of the oligomeric phosphate ester flame retardant. The oligomeric phosphate ester flame retardant can be a solid at room temperature (e.g., at 20 to 25° C., or 23° C.). An exemplary oligomeric phosphate ester flame retardant is available under the trade name FYROLFLEX SOL DP, available from ICL Industrial Products.

In an aspect, the organophosphorus flame retardant can comprise a phosphazene flame retardant. Phosphazenes (8) and cyclic phosphazenes (9)

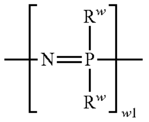
(8)

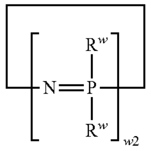
(9)

in particular can be used, wherein w1 is 3 to 10,000 and w2 is 3 to 25, preferably 3 to 7, and each $R^w$ is independently a $C_{1-12}$ alkyl, alkenyl, alkoxy, aryl, aryloxy, or polyoxyalkylene. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

In an aspect, the phosphazene flame retardant can comprise a cyclic phosphazene. In an aspect, the phosphazene flame retardant comprises phenoxy cyclotriphosphazene, octaphenoxy cyclotetraphosphazene decaphenoxy cyclopentaphosphazene, hexaphenoxycyclotriphosphazene or a combination thereof. In an aspect, the phosphazene can comprise hexaphenoxycyclotriphosphazene.

When present, the organophosphorus flame retardant can be included in the composition in an amount of 0.5 to 6 weight percent, based on the total weight of the polycarbonate composition. Within this range, the flame retardant can be present in an amount of 1 to 5 weight percent, or 1.5 to 4 weight percent, or 1.5 to 3.5 weight percent. In an aspect, the flame retardant can comprise the oligomeric phosphate ester and can be present in the composition in an amount of 0.5 to 6 weight percent, or 1 to 6 weight percent, or 2 to 6 weight percent or 2.5 to 6 weight percent. In an aspect, the flame retardant can comprise the phosphazene and can be present in an amount of 0.5 to 5 weight percent, or 0.5 to 4 weight percent, or 1 to 3 weight percent, or 1.5 to 2.5 weight percent. In an aspect, the flame retardant can comprise the phosphate ester flame retardant and can be present in an amount of 0.5 to 5 weight percent, or 1 to 5 weight percent, or 2 to 4 weight percent or 2.5 to 3.5 weight percent.

The polycarbonate composition can optionally further comprise an additive composition comprising one or more additives ordinarily incorporated into polymer compositions of this type, provided that the one or more additives are selected so as not to significantly adversely affect the desired properties of the polycarbonate composition, in particular impact, chemical resistance, and flame retardance. Additives can include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 weight percent, based on the total weight of the polycarbonate composition. In an aspect, the polycarbonate composition comprises no more than 5 weight percent based on the weight of the composition of a processing aid, a heat stabilizer, an antioxidant, an ultraviolet light absorber, or a combination thereof.

In an aspect, the polycarbonate composition can optionally comprise anti-drip agents. The anti-drip agent can be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

In an aspect, the polycarbonate composition can optionally comprise an antimicrobial agent. Any antimicrobial agent generally known can be used either individually or in combination (i.e., of two or more). Exemplary antimicrobial agents can include, but are not limited to a metal containing agent, such as Ag, Cu, Al, Sb, As, Ba, Bi, B, Au, Pb, Hg, Ni, Th, Sn, Zn containing agent. In an aspect, the agent can be Ag containing agent. A suitable Ag containing agent can contain a silver ion, colloidal silver, silver salt, silver complex, silver protein, silver nanoparticle, silver functionalized clay, zeolite containing silver ions or any combinations thereof. Silver salts or silver complexes can include silver acetate, silver benzoate, silver carbonate, silver ionate, silver iodide, silver lactate, silver laureate, silver nitrate, silver oxide, silver palpitate, silver sulfadiazine, silver sulfate, silver chloride, or any combinations thereof.

When present, the antimicrobial agent can be included in an amount of 0.001 to 10 weight percent, based on the total weight of the polycarbonate composition. In an aspect, the composition can contain a Ag containing agent(s) in amounts such that and the silver content in the composition of 0.01 wt. % to 5 wt. %.

The polycarbonate composition can optionally exclude other components not specifically described herein. For example, the polycarbonate composition can exclude thermoplastic polymers other than the bisphenol A homopolycarbonate, the polycarbonate-siloxane copolymer, and the poly(carbonate-ester). For example, the composition can optionally exclude a polycarbonate other than the bisphenol A homopolycarbonate and the polycarbonate-siloxane copolymer and the poly(carbonate-ester). The polycarbonate composition can optionally exclude polyesters, for example poly(butylene terephthalate) or poly(ethylene terephthalate). The polycarbonate composition can optionally exclude impact modifiers, for example silicone-based impact modifiers different from the poly(carbonate-siloxane) copolymer, methyl methacrylate-butadiene-styrene copolymers, acrylonitrile-butadiene, styrene copolymers, and the like, or a combination thereof. The composition can exclude halogenated flame retardants, for example brominated flame retardants, including brominated polycarbonate (e.g., a polycarbonate containing brominated carbonate includes units derived from 2,2',6,6'-tetrabromo-4,4'-isopropylidenediphenol (TBBPA) and carbonate units derived from at least one dihydroxy aromatic compound that is not TBBPA), brominated epoxies, and the like or combinations thereof. The composition can optionally exclude flame retardants other than the phosphazene flame retardant, the phosphate ester flame retardant, or the oligomeric phosphate flame retardant. The composition can optionally exclude inorganic flame retardants.

The present inventors have unexpectedly discovered that the polycarbonate composition can exhibit a desirable combination of properties including good chemical resistance, flame retardance, and impact strength when a particular combination of bisphenol A polycarbonate homopolymer, polycarbonate-siloxane copolymer, poly(ester-carbonate) and flame retardant are used in the composition, each in particular amounts.

Accordingly, the composition can advantageously exhibit one or more desirable properties. For example, it was found that improved chemical resistance can unexpectedly be obtained by combining a polycarbonate, preferably a bisphenol A polycarbonate homopolymer, with a polycarbonate-siloxane having a particular siloxane content and a poly(carbonate-ester). These compositions can have balanced properties, including two or more of chemical resistance, flame retardance, impact, and flow properties. Without wishing to be bound by theory, it is believed that the unexpected combination of chemical resistance, flame retardance, impact, and flow properties is achieved by careful selection of the components of the composition including the selection of weight percent of the siloxane units in the polycarbonate-siloxane, as well as careful selection of the flame retardant component (when present).

The composition can have good chemical resistance. In an aspect, the polycarbonate composition can have a tensile elongation retention of at least 80% after exposure of an ISO tensile bar for 72 hours to DOT 4 or DOT 5.1 brake fluid at a temperature of 23° C. under 0% strain tested per ISO 527 at rate of 50 mm/min relative to a non-exposed sample of the same composition.

The polycarbonate composition can further have good impact properties, in particular Izod notched impact strength. In an aspect, the composition can have an Izod notched impact energy of at least 650 joules per meter measured at 23° C. on a sample of 3.2 mm thickness according to ASTM D256-10. The composition can also have an Izod notched impact energy of at least 400 joules per meter measured at −30° C. on a sample of 3.2 mm thickness according to ASTM D256-10.

The polycarbonate composition can further have good melt viscosity, which aids in processing. The polycarbonate composition can have a melt volume rate (MVR, cubic centimeters per 10 minutes ($cm^3$/10 min) of 3 to 20 $cm^3$/10 min or 4 to 15 $cm^3$/10 min, greater or equal to 3 $cm^3$/10 min, or greater than or equal to 4 $cm^3$/10 min, determined in accordance with ISO 1133 under a load of 1.2 kg at 300° C.

The polycarbonate composition can further have good flame retardant properties particularly when the organophosphorus flame retardant is present. In an aspect of measuring flame retardance, the UL94 standard utilizes a rating of V0, V1, V2 or HB, wherein a rating of V0 is better than V1 or V2 and is required for many applications at the actual part thickness. Using this standard, the polycarbonate compositions are formed into a molded article having a given thickness. The thinner the article, the more difficult it is to achieve a rating of V0 or V1. In as aspect, a molded sample of the polycarbonate composition is capable of achieving UL-94 V0 rating at a thickness of 1.5 millimeters or less, preferably a UL-94 rating of V0 at a thickness of less than or equal to 1.2 millimeters; more preferably a UL-94 rating of V0 at a thickness of less than or equal to 1.0 millimeters.

In an aspect, the composition can have a tensile elongation retention of at least 80% after exposure of an ISO tensile bar for 72 hours to DOT 4 or DOT 5.1 brake fluid at a temperature of 23° C. under 0% strain tested per ISO 527 at rate of 50 mm/min relative to a non-exposed sample of the same composition, an Izod notched impact energy of at least 650 joules per meter measured at 23° C. on a sample of 3.2 mm thickness according to ASTM D256-10, an Izod notched impact energy of at least 400 joules per meter measured at −30° C. on a sample of 3.2 mm thickness according to ASTM D256-10, and a melt volume rate (MVR, cubic centimeters per 10 minutes ($cm^3$/10 min)) of 3 to 20 $cm^3$/10 min or 4 to 15 $cm^3$/10 min, greater or equal to 3 $cm^3$/10 min, or greater than or equal to 4 $cm^3$/10 min, determined in accordance with ISO 1133 under a load of 1.2 kg at 300° C.

In an aspect, the composition can have a tensile elongation retention of at least 80% after exposure of an ISO tensile bar for 72 hours to DOT 4 or DOT 5.1 brake fluid at a temperature of 23° C. under 0% strain tested per ISO 527 at rate of 50 mm/min relative to a non-exposed sample of the same composition, a UL-94 V0 rating at a thickness of 1.5 millimeters or less, an Izod notched impact energy of at least 650 joules per meter measured at 23° C. on a sample of 3.2 mm thickness according to ASTM D256-10, an Izod notched impact energy of at least 400 joules per meter measured at −30° C. on a sample of 3.2 mm thickness according to ASTM D256-10, and a melt volume rate (MVR, cubic centimeters per 10 minutes ($cm^3$/10 min)) of 3 to 20 $cm^3$/10 min or 4 to 15 $cm^3$/10 min, greater or equal to 3 $cm^3$/10 min, or greater than or equal to 4 $cm^3$/10 min, determined in accordance with ISO 1133 under a load of 1.2 kg at 300° C.

The polycarbonate composition comprises 10 to 99 weight percent, based on the total weight of the polycarbonate composition, of a bisphenol A polycarbonate homopolymer; a polycarbonate-siloxane copolymer having a siloxane content of greater than 30 to 70 weight percent, preferably 35 to 65 weight percent, based on the total weight of the polycarbonate-siloxane copolymer; wherein the polycarbonate-siloxane copolymer is present in an amount to provide a total siloxane content of 0.5 to 20 weight percent, based on the total weight of the polycarbonate composition; 15 to 45 weight percent of a poly(ester-carbonate); and optionally, 0.5 to 5 weight percent, based on the total weight of the polycarbonate composition, of an organophosphorus flame retardant. A molded sample of the composition exhibits: a tensile elongation retention of at least 80% after exposure to DOT 4 or DOT 5.1 brake fluid for 72 hours at a temperature of 23° C. under 0% strain compared to non-exposed tensile bars made from the same composition; and an Izod notched impact strength of greater than 650 kilojoules per meter at a temperature of 23° C., as determined according to ASTM D256-10; and optionally, an Izod notched impact strength of greater than 400 kilojoules per meter at a temperature of −30° C., as determined according to ASTM D256-10. When the organophosphorus flame retardant is present, the polycarbonate composition further exhibits a UL-94 rating of V0 at a thickness of 1.5 millimeters or less; preferably a UL-94 rating of V0 at a thickness of less than or equal to 1.2 millimeters. The bisphenol A polycarbonate homopolymer comprises a linear bisphenol A polycarbonate homopolymer having a weight average molecular weight of 15,000 to 40,000 grams per mole, as determined by gel permeation chromatography relative to linear bisphenol A polycarbonate standards. Preferably, the bisphenol A polycarbonate homopolymer comprises a linear bisphenol A polycarbonate homopolymer having a weight average molecular weight of to 25,000 grams per mole, preferably 17,000 to 25,000 grams per mole, as determined by gel permeation chromatography relative to linear bisphenol A polycarbonate standards; or a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; or a combination thereof; more preferably, wherein the bisphenol A polycarbonate homopolymer comprises a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards. The polycarbonate-siloxane copolymer can comprise bisphenol A carbonate repeating units and poly(dimethyl siloxane) repeating units. The polycarbonate-siloxane copolymer can have a siloxane content of 35 to 65 weight percent based on the total weight of the polycarbonate-siloxane copolymer. The polycarbonate-siloxane copolymer has a weight average molecular weight of 17,000 to 50,000 g/mol, or 17,000 to 45,000 g/mol, or 20,000 to 45,000 g/mol, or 30,000 to 45,000 g/mol, or 32,000 to 36,000 g/mol, or 30,000 to 45,000 g/mol, or 32,000 to 45,000 g/mol, or 35,000 to 45,000 g/mol, or 35,000 to 40,000 g/mol, or 32,000 to 40,000 g/mol, as determined by gel permeation chromatography using a crosslinked styrene-divinyl benzene column, at a sample concentration of 1 milligram per milliliter, and as calibrated with bisphenol A polycarbonate standards. The poly(ester-carbonate) comprises a poly (phthalate-carbonate). When present, the organophosphorus flame retardant comprises a phosphazene, a phosphate ester, an oligomeric phosphate ester, or a combination thereof, preferably a phosphazene flame retardant, an oligomeric phosphate ester flame retardant, or a combination thereof. The polycarbonate composition can comprise 0.1 to 10 weight percent, based on the total weight of the polycarbonate composition, of an additive composition. The polycarbonate composition can comprise 0.001 to 10 weight percent of an antimicrobial agent.

In an aspect, the polycarbonate composition can comprise 25 to 75 weight percent of the bisphenol A polycarbonate homopolymer; 5 to 15 weight percent of the polycarbonate-siloxane copolymer; and 20 to 60 weight percent of the poly(ester carbonate). In an aspect, the polycarbonate composition can comprise 40 to 90 weight percent of the bisphenol A polycarbonate homopolymer; 5 to 15 weight percent of the polycarbonate-siloxane copolymer; 20 to 40 weight percent of the poly(ester carbonate); and 1 to 5 weight percent of the organophosphorus flame retardant.

In an aspect, the polycarbonate composition can comprise 25 to 75 weight percent of the bisphenol A polycarbonate homopolymer; 5 to 15 weight percent of the polycarbonate-siloxane copolymer; and 20 to 60 weight percent of the poly(ester carbonate), and the bisphenol A polycarbonate homopolymer comprises a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; the polycarbonate-siloxane copolymer comprises bisphenol A carbonate repeating units and poly(dimethyl siloxane) repeating units; the polycarbonate-siloxane copolymer has a siloxane content of 35 to 65 weight percent based on the total weight of the polycarbonate-siloxane copolymer; the poly(ester-carbonate) comprises a poly(phthalate-carbonate); wherein a molded sample of the polycarbonate composition exhibits: a tensile elongation retention of at least 80% after exposure to DOT 4 or DOT 5.1 brake fluid for 72 hours at a temperature of 23° C. under 0% strain compared to non-exposed tensile bars made from the same composition; an Izod notched impact strength of greater than 650 kilojoules per meter at a temperature of 23° C., as determined according to ASTM D256-10; an Izod notched impact strength of greater than 400 kilojoules per meter at a temperature of −30° C., as determined according to ASTM D256-10.

In an aspect, the polycarbonate composition can comprise 40 to 90 weight percent of the bisphenol A polycarbonate homopolymer; 5 to 15 weight percent of the polycarbonate-siloxane copolymer; 20 to 40 weight percent of the poly (ester carbonate); and 1 to 5 weight percent of the organophosphorus flame retardant, and the bisphenol A polycarbonate homopolymer comprises a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; the polycarbonate-siloxane copolymer comprises bisphenol A carbonate repeating units and poly(dimethyl siloxane) repeating units; the polycarbonate-siloxane copolymer has a siloxane content of 35 to 65 weight percent based on the total weight of the polycarbonate-siloxane copolymer; the poly(ester-carbonate) comprises a poly(phthalate-carbonate); and the organophosphorus flame retardant comprises a cyclic phosphazene, preferably hexaphenoxycyclotriphosphazene, or an oligomeric phosphate ester flame retardant comprising 5 to 15 weight percent phosphorus, based on the total weight of the oligomeric phosphate ester, preferably wherein the oligomeric phosphate ester is a solid at room temperature; wherein a molded sample of the polycarbonate composition exhibits: a tensile elongation retention of at least 80% after exposure to DOT 4 or DOT 5.1 brake fluid for 72 hours at a temperature of 23° C. under 0% strain compared to non-exposed tensile bars made from the same composition; an Izod notched impact strength of greater than 650 kilojoules per meter at a temperature of 23° C., as determined according to ASTM D256-10; an Izod notched impact strength of greater than 400 kilojoules per meter at a temperature of −30° C., as determined according to ASTM D256-10; and a UL-94 rating of V0 at a thickness of 1.5 millimeters or less; preferably a UL-94 rating of V0 at a thickness of less than or equal to 1.2 millimeters.

The polycarbonate composition can be manufactured by various methods known in the art. For example, powdered polycarbonate homopolymer, polycarbonate-siloxane and other optional components are first blended, optionally with any fillers, in a high-speed mixer or by hand mixing. The blend is then fed into the throat of a twin-screw extruder via a hopper. Alternatively, at least one of the components can be incorporated into the composition by feeding it directly into the extruder at the throat and/or downstream through a side stuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, casted, or molded articles comprising the polycarbonate composition are also provided. The polycarbonate composition can be molded into useful shaped articles by a variety of methods, such as injection molding, extrusion, rotational molding, blow molding, and thermoforming. The article can be a molded article, a thermoformed article, an extruded film, an extruded sheet, a honeycomb structure, one or more layers of a multi-layer article, a substrate for a coated article, and a substrate for a metallized article.

This disclosure is further illustrated by the following examples, which are non-limiting.

EXAMPLES

Materials used in the following examples are described in Table 1.

TABLE 1

| Component | Description | Supplier |
|---|---|---|
| PCSi-1 | Bisphenol A polycarbonate-polydimethylsiloxane block copolymer having a siloxane content of 20 weight percent, average PDMS block length of 45 units, having a Mw of 29,500 to 30,500 grams per mole as determined by gel permeation chromatography relative to linear bisphenol A polycarbonate standards, produced by interfacial polymerization and endcapped with p-cumylphenol | SABIC |
| PCSi-2 | Polycarbonate-siloxane copolymer having a siloxane content of 40 weight percent, average PDMS block length of 45 units, having a Mw of 31,500 to 32,500 grams per mole as determined by gel permeation chromatography relative to linear bisphenol A polycarbonate standards produced by interfacial polymerization and endcapped with p-cumylphenol | SABIC |

TABLE 1-continued

| Component | Description | Supplier |
|---|---|---|
| PPC | Poly(bisphenol A carbonate-bisphenol A phthalate) having 19-21 wt % bisphenol A carbonate units and 79-81 wt % bisphenol A phthalate groups with an isophthalate:terephthalate ratio of 93:7; having a Tg of 174° C. as determined by TGA; Mw = 27,000-29,000 grams per mole as determined by gel permeation chromatography relative to bisphenol A homopolycarbonate standards | SABIC |
| PC-1 | Linear bisphenol A polycarbonate, CAS Reg. No, 25971-63-5, having a molecular weight (Mw) of 30,000-31,000 grams per mole, as determined by gel permeation chromatography relative to linear bisphenol A polycarbonate standards, produced by interfacial polymerization and endcapped with p-cumylphenol | SABIC |
| PC-2 | Linear bisphenol A polycarbonate having a Mw of 20,000-22,000 grams per mole, as determined by gel permeation chromatography relative to linear bisphenol A polycarbonate standards, produced by interfacial polymerization and endcapped with p-cumylphenol | SABIC |
| TBPP | Tris(2,4-di-tert-butylphenyl) phosphite, CAS Reg. No. 31570-04-4; obtained as IRGAFOS ™ 168 | BASF |
| PETS | Pentaerythritol tetrastearate, CAS Reg. No. 115-83-3 | FACI SpA |
| Phosphazene | Phenoxycyclophosphazene; obtained as RABITLE FP-110 | Fushimi Pharmaceutical Co., Ltd. |
| RDX | Resorcinol bis(di-2,6-xylylphosphate), obtained as PX-200 | Daihachi Chemical Industry |
| SOLDP | Solid oligomeric phosphate ester; (free flowing powder at 23° C.), having 10.5 percent phosphorus by weight; commercially available as FYROLFLEX Sol-DP | ICL Industrial Products |
| UVA | 2-[2-hydroxy-3,5-di-(1,1-dimethylbenzyl)]-2H-benzotriazol, obtained as TINUVIN 234 | BASF |
| TSAN | Poly(styrene-acrylonitrile)-encapsulated polytetrafluoroethylene, containing 50 weight percent polytetrafluoroethylene; obtained as INP449 | SABIC |

The compositions of the following examples were prepared by blending the components together and extruding on a 37 mm twin-screw extruder at a temperature of 285 to 330° C., though it will be recognized by one skilled in the art that the method is not limited to these temperatures. The compositions were subsequently injection molded at a temperature of 285 to 380° C., though it will be recognized by one skilled in the art that the method is not limited to these temperatures.

Physical measurements were made using the tests and test methods described below.

A ball pressure test at 125° C. was conducted according to IEC 60695.

Notched Izod impact Strength (INI) was determined in accordance with ASTM D256-10 under a load of 5 lbf at different temperatures including a temperature of 23° C. or −30° C. All ASTM INI determinations were carried out on sample plaques of 3.2 mm thickness. For the test at −30° C., the test specimens were placed in the freezer for more than 4 hours then taken out for testing at room temperature within five seconds.

Melt volume-flow rate (MVR) was determined in accordance with ISO1133 under a load of 1.2 kg at 300° C. with a dwell time of 300 s. Prior to the testing the pellets were pre-dried at 120° C. for 3 hours.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as UL94 HB, V0, V1, V2, 5VA or 5VB. The test specimens were aged at 23° C., 50% RH for more than 2 days or 70° C. for 168 hours before testing.

Tensile properties were measured in accordance with ISO 527 at 50 mm/min at room temperature on standard ISO tensile bars.

Environmental stress cracking resistance (ESCR) describes the accelerated failure of polymeric materials, as a combined effect of environment, temperature, and stress. The failure mainly depends on the characteristics of the material, chemical, exposure condition, and the magnitude of the stress. The ASTM tensile bars were clamped to a semicircular jig to impart a constant strain of 0%. The bars were than exposed to DOT 4 or DOT 5.1 brake fluid for three days at 23° C. The criteria for evaluating chemical resistance is shown in Table 2. Compositions and test results are shown in Table 3. In Table 3, the amount of each component is provided in weight percent, based on the total weight of the composition.

TABLE 2

| Rating | Yield Strength (% Retention) | Elongation @ Break (% Retention) | Inference |
|---|---|---|---|
| Compatible | ≥90% | 80-139% | Property retained |
| Marginal | 80-89% | 65-79% | On-set of possible failure |
| Not | ≤79% | <65% | Craze/crack observed |
| Compatible | ≥140% | | Plasticization; Specimens softened |

TABLE 3

| Component | Unit | Ex. 1 | Ex. 2 | Ex. 3 | CEx. 1 |
|---|---|---|---|---|---|
| PCSi-1 | wt % | | | | |
| PCSi-2 | wt % | 11.1 | 11.1 | 5 | 12 |
| PPC | wt % | 40 | 60 | 20 | |
| PC-1 | wt % | 24.31 | 14.21 | 38.71 | 35.23 |
| PC-2 | wt % | 24.1 | 14.2 | 35.8 | 52.37 |

TABLE 3-continued

| Component | Unit | Ex. 1 | Ex. 2 | Ex. 3 | CEx. 1 |
|---|---|---|---|---|---|
| TBPP | wt % | 0.09 | 0.09 | 0.09 | 0.1 |
| PETS | wt % | 0.1 | 0.1 | 0.1 | 0.3 |
| Phosphazene | wt % | | | | |
| RDX | wt % | | | | |
| SOLDP | wt % | | | | |
| UVA | wt % | 0.3 | 0.3 | 0.3 | |
| TSAN | wt % | | | | |
| Properties | | | | | |
| MVR | $cm^3$/10 min | 5.07 | 3.04 | 7 | 8 |
| ECSR (brake fluid) (tens. elong. retention) | | 89% | 105% | 80% | 20% |

Examples 1 and 2 of Table 3 show compositions where a high siloxane content polycarbonate-siloxane copolymer was used in combination with a poly(bisphenol A carbonate-bisphenol A phthalate) (PPC) at loadings of 40 and 60%, respectively. These formulations achieved good retention of properties after 3 days exposure to brake fluid, one of the most aggressive chemicals used in the automotive industry for polycarbonate and other thermoplastics, with 80% or more retention, which is significantly improved compared to similar composition without the PPC (Comparative Example 1) which only retains 20% of elongation at break. Example 3 is an example of combination of the high siloxane content polycarbonate-siloxane copolymer and PPC at lower loading of 20% and shows again improved chemical resistance compared to the Comparative Example. All these combinations show improved chemical resistance compared with formulation containing high siloxane content polycarbonate-siloxane copolymer but without PPC (Comparative Example 1). This latter formulation did not achieve the required strong chemical resistance after exposure to brake fluid.

Compositions including a flame retardant were further tested to provide combined chemical resistance and flame retardant properties. The results are shown in Table 4, where the amount of each component is provided in weight percent, based on the total weight of the composition.

TABLE 4

| Component | Unit | CEx. 2 | Ex. 4 | Ex. 5 | CEx. 3 | Ex. 6 | Ex. 7 | CEx. 4 | Ex. 8 | Ex. 9 | Ex. 10 |
|---|---|---|---|---|---|---|---|---|---|---|---|
| PCSi-1 | wt % | | | | | | | | | | |
| PCSi-2 | wt % | 11.1 | 11.1 | 11.1 | 11.1 | 11.1 | 11.1 | 11.1 | 11.1 | 11.1 | 11.1 |
| PPC | wt % | | 20 | 40 | | 20 | 40 | | 20 | 40 | 40 |
| PC-1 | wt % | 44.96 | 34.96 | 24.96 | 43.96 | 33.96 | 23.96 | 43.96 | 33.96 | 23.96 | 20.96 |
| PC-2 | wt % | 40.95 | 30.95 | 20.95 | 40.95 | 30.95 | 20.95 | 40.95 | 30.95 | 20.95 | 20.95 |
| TBPP | wt % | 0.09 | 0.09 | 0.09 | 0.09 | 0.09 | 0.09 | 0.09 | 0.09 | 0.09 | 0.09 |
| PETS | wt % | 0.1 | 0.1 | 0.1 | 0.1 | 0.1 | 0.1 | 0.1 | 0.1 | 0.1 | 0.1 |
| Phosphazene | wt % | 2 | 2 | 2 | | | | | | | |
| RDX | wt % | | | | 3 | 4 | 3 | | | | |
| SOLDP | wt % | | | | | | | 3 | 3 | 3 | 6 |
| UVA | wt % | 0.3 | 0.3 | 0.3 | 0.3 | 0.3 | 0.3 | 0.3 | 0.3 | 0.3 | 0.3 |
| TSAN | wt % | 0.5 | 0.5 | 0.5 | 0.5 | 0.5 | 0.5 | 0.5 | 0.5 | 0.5 | 0.5 |
| Properties | | | | | | | | | | | |
| BPT (125°) | ° C. | Pass | Pass | Pass | Pass | Pass | Pass | Pass | Pass | Pass | Fail |
| INI (23° C.) | J/m | 786 | 775 | 693 | 818 | 792 | 699 | 747 | 791 | 709 | 697 |
| INI (−30° C.) | J/m | 678 | 628 | 573 | 670 | 654 | 513 | 651 | 647 | 533 | 491 |
| MVR | $cm^3$/10 min | 6.6 | 4.3 | .4 | 7.2 | 4.7 | 3.3 | 6.3 | 5 | 3 | 4 |
| UL 94 (1.2 mm) | s | 32 | 39 | 42 | ND | 37 | 41 | ND | 25 | 40 | 21 |
| UL94 (1.0 mm) | s | 31 | 50 | 38 | ND | 39 | 45 | ND | 34 | 36 | 23 |
| ECSR (brake fluid) (tens. elong. retention) | | 75% | 81% | 89% | 60% | 83% | 89% | 19% | 81% | 87% | 110% |

Examples 4 and 5 of Table 4 show compositions where a high siloxane content polycarbonate-siloxane copolymer was used in combination with a poly(bisphenol A carbonate-bisphenol A phthalate) (PPC) and an organophosphorus flame retardant (e.g., phosphazene). These compositions allow for achieving good flame retardant properties at 1.2 millimeter thickness and below, together with good retention of mechanical properties after 3 days of exposure to brake fluid, an extremely aggressive chemical used in the automotive industry. Comparative example 2 is based on a high siloxane content polycarbonate-siloxane copolymer with a phosphazene flame retardant without PPC. As shown in Table 4, this example did not achieve the desired chemical resistance after exposure to brake fluid, retaining only 75% of the tensile elongation at break.

The compositions of examples 6 and 7 show a formulation where the high siloxane content polycarbonate-siloxane copolymer was used in combination with PPC and the RDX organophosphorus flame retardant. These compositions achieved good flame retardance at 1.2 millimeter thickness and below, together with good retention of mechanical properties after three days of exposure to brake fluid. Comparative example 3 shows the combination of high siloxane content polycarbonate-siloxane copolymer with an organophosphorus flame retardant without PPC, and it can be seen that this composition fails to achieve the required chemical resistance after exposure to brake fluid, retaining only 60% of the tensile elongation at break.

Examples 8 and 9 illustrate compositions where the high siloxane content polycarbonate-siloxane copolymer was used in combination with PPC and an organophosphorus flame retardant (SOL DP). These compositions achieved good flame retardance at 1.2 millimeter thickness and below, together with good retention of mechanical properties after two days of exposure to brake fluid. Comparative example 4 shows the combination of high siloxane content polycarbonate-siloxane copolymer with an organophosphorus flame retardant without PPC, and it can be seen that this composition fails to achieve the required chemical resistance after exposure to brake fluid, retaining only 60% of the tensile elongation at break. The composition of example 10 has the same formulation as example 9 but contains a higher loading of the organophosphorous flame retardant and PPC. It can be seen from Table 4 that this composition again met the required chemical resistance.

Thus, the present inventors have shown that a desirable combination of chemical resistance and flame retardancy can be achieved through a specific composition which includes a phosphorus-containing flame retardant, a high siloxane content polycarbonate-siloxane copolymer, and a polycarbonate-ester. The composition of the present disclosure can also advantageously retain high heat properties and withstand impact, even at low temperatures. Thus, a significant improvement is provided by the present disclosure.

This disclosure further encompasses the following aspects.

Aspect 1: A polycarbonate composition comprising: 10 to 99 weight percent, based on the total weight of the polycarbonate composition, of a bisphenol A polycarbonate homopolymer; a polycarbonate-siloxane copolymer having a siloxane content of greater than 30 to 70 weight percent, preferably 35 to 65 weight percent, based on the total weight of the polycarbonate-siloxane copolymer; wherein the polycarbonate-siloxane copolymer is present in an amount to provide a total siloxane content of 0.5 to 20 weight percent, based on the total weight of the polycarbonate composition; 15 to 45 weight percent of a poly(ester-carbonate); and optionally, 0.5 to 6 weight percent, based on the total weight of the polycarbonate composition, of an organophosphorus flame retardant.

Aspect 2: The polycarbonate composition of aspect 1, wherein a molded sample of the composition exhibits: a tensile elongation retention of at least 80% after exposure to DOT 4 or DOT 5.1 brake fluid for 72 hours at a temperature of 23° C. under 0% strain compared to non-exposed reference sample of the same composition; and an Izod notched impact strength of greater than 650 kilojoules per meter at a temperature of 23° C., as determined according to ASTM D256-10; and optionally, an Izod notched impact strength of greater than 400 kilojoules per meter at a temperature of −30° C., as determined according to ASTM D256-10.

Aspect 3: The polycarbonate of aspect 1 or 2, wherein the organophosphorus flame retardant is present, and wherein the polycarbonate composition further exhibits a UL-94 rating of V0 at a thickness of 1.5 millimeters or less; preferably a UL-94 rating of V0 at a thickness of less than or equal to 1.2 millimeters.

Aspect 4: The polycarbonate composition of any of aspects 1 to 3, wherein the bisphenol A polycarbonate homopolymer comprises a linear bisphenol A polycarbonate homopolymer having a weight average molecular weight of 15,000 to 40,000 grams per mole, as determined by gel permeation chromatography relative to linear bisphenol A polycarbonate standards, preferably wherein the bisphenol A polycarbonate homopolymer comprises a linear bisphenol A polycarbonate homopolymer having a weight average molecular weight of 15,000 to 25,000 grams per mole, preferably 17,000 to 25,000 grams per mole, as determined by gel permeation chromatography relative to linear bisphenol A polycarbonate standards; or a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; or a combination thereof; more preferably, wherein the bisphenol A polycarbonate homopolymer comprises a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards.

Aspect 5: The polycarbonate composition of any of aspects 1 to 4, wherein the polycarbonate-siloxane copolymer comprises bisphenol A carbonate repeating units and poly(dimethyl siloxane) repeating units.

Aspect 6: The polycarbonate composition of any of aspects 1 to 5, wherein the polycarbonate-siloxane copolymer has a weight average molecular weight of 17,000 to 50,000 g/mol, or 17,000 to 45,000 g/mol, or 20,000 to 45,000 g/mol, or 30,000 to 45,000 g/mol, or 32,000 to 36,000 g/mol, or 30,000 to 45,000 g/mol, or 32,000 to 45,000 g/mol, or 35,000 to 45,000 g/mol, or 35,000 to 40,000 g/mol, or 32,000 to 40,000 g/mol, as determined by gel permeation chromatography using a crosslinked styrene-divinyl benzene column, at a sample concentration of 1 milligram per milliliter, and as calibrated with bisphenol A polycarbonate standards.

Aspect 7: The polycarbonate composition of any of aspects 1 to 6, wherein the poly(ester-carbonate) comprises a poly(phthalate-carbonate).

Aspect 8: The polycarbonate composition of any of aspects 1 to 7, wherein the organophosphorus flame retardant is present and comprises a phosphazene, a phosphate ester, an oligomeric phosphate ester, or a combination thereof, preferably a phosphazene flame retardant, an oligomeric phosphate ester flame retardant, or a combination thereof.

Aspect 9: The polycarbonate composition of any of aspects 1 to 8, wherein one or more of the bisphenol A homopolymer carbonate, the polycarbonate-siloxane copolymer, and the poly(ester-carbonate) are derived from post-consumer recycled or post-industrial recycled materials or can be produced from at least one monomer derived from bio-based or plastic waste feedstock.

Aspect 10: The polycarbonate composition of any of aspects 1 to 9, wherein the polycarbonate composition further comprises 0.1 to 10 weight percent, based on the total weight of the polycarbonate composition, of an additive composition, preferably comprising an anti-drip agent.

Aspect 11: The polycarbonate composition of any of aspects 1 to 10, wherein the polycarbonate composition further comprises 0.001 to 10 weight percent of an antimicrobial agent, preferably wherein the antimicrobial agent comprises a silver-containing agent.

Aspect 12: The polycarbonate composition of any of aspects 1 to 11, comprising 25 to 75 weight percent of the bisphenol A polycarbonate homopolymer; 5 to 20 weight percent of the polycarbonate-siloxane copolymer; and 20 to 60 weight percent of the poly(ester carbonate); or 40 to 90 weight percent of the bisphenol A polycarbonate homopolymer; 5 to 15 weight percent of the polycarbonate-siloxane copolymer; 20 to 40 weight percent of the poly(ester carbonate); and 1 to 6 weight percent of the organophosphorus flame retardant.

Aspect 13: The polycarbonate composition of aspect 12, wherein the bisphenol A polycarbonate homopolymer comprises a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; the polycarbonate-siloxane copolymer comprises bisphenol A carbonate repeating units and poly(dimethyl siloxane) repeating units; the polycarbonate-siloxane copolymer has a siloxane content of 35 to 65 weight percent based on the total weight of the polycarbonate-siloxane copolymer; the poly(ester-carbonate) comprises a poly(phthalate-carbonate); and when present, the organophosphorus flame retardant comprises a cyclic phosphazene, preferably hexaphenoxycyclotriphosphazene, or an oligomeric phosphate ester flame retardant comprising 5 to 15 weight percent phosphorus, based on the total weight of the oligomeric phosphate ester, preferably wherein the oligomeric phosphate ester is a solid at room temperature; wherein a molded sample of the polycarbonate composition exhibits: a tensile elongation retention of at least 80% after exposure to DOT 4 or DOT 5.1 brake fluid for 72 hours at a temperature of 23° C. under 0% strain compared to non-exposed reference sample of the same composition; an Izod notched impact strength of greater than 650 joules per meter at a temperature of 23° C., as determined according to ASTM D256-10; an Izod notched impact strength of greater than 400 joules per meter at a temperature of −30° C., as determined according to ASTM D256-10; and when the organophosphorus flame retardant is present, a UL-94 rating of V0 at a thickness of 1.5 millimeters or less; preferably a UL-94 rating of V0 at a thickness of less than or equal to 1.2 millimeters.

Aspect 14: A method of making the polycarbonate composition of any of aspects 1 to 13, the method comprising melt-mixing the components of the composition, and, optionally, extruding the composition.

Aspect 15: An article comprising the polycarbonate composition of any of aspects 1 to 13.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC=CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polycarbonate composition comprising:

10 to 99 weight percent, based on the total weight of the polycarbonate composition, of a bisphenol A polycarbonate homopolymer;

a polycarbonate-siloxane copolymer having a siloxane content of greater than 30 to 70 weight percent, based on the total weight of the polycarbonate-siloxane copolymer;

wherein the polycarbonate-siloxane copolymer is present in an amount to provide a total siloxane content of 0.5 to 20 weight percent, based on the total weight of the polycarbonate composition;

15 to 45 weight percent of a poly(ester-carbonate); and optionally, 0.5 to 6 weight percent, based on the total weight of the polycarbonate composition, of an organophosphorus flame retardant;

wherein a molded sample of the composition exhibits:

a tensile elongation retention of at least 80% after exposure to DOT 4 or DOT 5.1 brake fluid for 72 hours at a temperature of 23° C. under 0% strain compared to non-exposed reference sample of the same composition; and an Izod notched impact strength of greater than 650 kilojoules per meter at a temperature of 23° C., as determined according to ASTM D256-10; and optionally, an Izod notched impact strength of greater than 400 kilojoules per meter at a temperature of −30° C., as determined according to ASTM D256-10.

2. The polycarbonate composition of claim 1, wherein a molded sample of the composition exhibits an Izod notched impact strength of greater than 400 kilojoules per meter at a temperature of −30° C., as determined according to ASTM D256-10.

3. The polycarbonate of claim 1, wherein the organophosphorus flame retardant is present, and wherein the polycarbonate composition further exhibits a UL-94 rating of V0 at a thickness of 1.5 millimeters or less.

4. The polycarbonate composition of claim 1, wherein the bisphenol A polycarbonate homopolymer comprises a linear bisphenol A polycarbonate homopolymer having a weight average molecular weight of 15,000 to 40,000 grams per mole, as determined by gel permeation chromatography relative to linear bisphenol A polycarbonate standards.

5. The polycarbonate composition of claim 1, wherein the polycarbonate-siloxane copolymer comprises bisphenol A carbonate repeating units and poly(dimethyl siloxane) repeating units.

6. The polycarbonate composition of claim 1, wherein the polycarbonate-siloxane copolymer has a weight average molecular weight of 17,000 to 50,000 g/mol, as determined by gel permeation chromatography using a crosslinked styrene-divinyl benzene column, at a sample concentration of 1 milligram per milliliter, and as calibrated with bisphenol A polycarbonate standards.

7. The polycarbonate composition of claim 1, wherein the poly(ester-carbonate) comprises a poly(phthalate-carbonate).

8. The polycarbonate composition of claim 1, wherein the organophosphorus flame retardant is present and comprises a phosphazene, a phosphate ester, an oligomeric phosphate ester, or a combination thereof.

9. The polycarbonate composition of claim 1, wherein one or more of the bisphenol A homopolymer carbonate, the polycarbonate-siloxane copolymer, and the poly(ester-carbonate) are derived from post-consumer recycled or post-industrial recycled materials or can be produced from at least one monomer derived from bio-based or plastic waste feedstock.

10. The polycarbonate composition of claim 1, wherein the polycarbonate composition further comprises 0.1 to 10 weight percent, based on the total weight of the polycarbonate composition, of an additive composition.

11. The polycarbonate composition of claim 1, wherein the polycarbonate composition further comprises 0.001 to 10 weight percent of an antimicrobial agent.

12. The polycarbonate composition of claim 1, comprising 25 to 75 weight percent of the bisphenol A polycarbonate homopolymer;

5 to 20 weight percent of the polycarbonate-siloxane copolymer; and 20 to 40 weight percent of the poly(ester carbonate).

13. The polycarbonate composition of claim 12, wherein the bisphenol A polycarbonate homopolymer comprises a linear bisphenol A polycarbonate homopolymer having a weight average molecular weight of 26,000 to 40,000 grams per mole, as determined by gel permeation chromatography relative to linear bisphenol A polycarbonate standards;

the polycarbonate-siloxane copolymer comprises bisphenol A carbonate repeating units and poly(dimethyl siloxane) repeating units;

the polycarbonate-siloxane copolymer has a siloxane content of 35 to 65 weight percent based on the total weight of the polycarbonate-siloxane copolymer;

the poly(ester-carbonate) comprises a poly(phthalate-carbonate); and when present, the organophosphorus flame retardant comprises a cyclic phosphazene, preferably hexaphenoxycyclotriphosphazene, or an oligomeric phosphate ester flame retardant comprising 5 to 15 weight percent phosphorus, based on the total weight of the oligomeric phosphate ester, preferably wherein the oligomeric phosphate ester is a solid at room temperature; wherein a molded sample of the polycarbonate composition exhibits:

a tensile elongation retention of at least 80% after exposure to DOT 4 or DOT 5.1 brake fluid for 72 hours at a temperature of 23° C. under 0% strain compared to non-exposed reference sample of the same composition;

an Izod notched impact strength of greater than 650 joules per meter at a temperature of 23° C., as determined according to ASTM D256-10;

an Izod notched impact strength of greater than 400 joules per meter at a temperature of −30° C., as determined according to ASTM D256-10; and when the organophosphorus flame retardant is present, a UL-94 rating of V0 at a thickness of 1.5 millimeters or less.

14. A method of making the polycarbonate composition of claim 1, the method comprising melt-mixing the components of the composition, and, optionally, extruding the composition.

15. An article comprising the polycarbonate composition of claim 1.

16. The polycarbonate composition of claim 1, comprising 40 to 90 weight percent of the bisphenol A polycarbonate homopolymer;

20 to 15 weight percent of the polycarbonate-siloxane copolymer;

20 to 40 weight percent of the poly(ester carbonate); and 1 to 6 weight percent of the organophosphorus flame retardant.

* * * * *